(12) United States Patent
Lu et al.

(10) Patent No.: US 10,892,637 B2
(45) Date of Patent: Jan. 12, 2021

(54) POWER SUPPLY AND POWER SUPPLYING METHOD WITH POWER BACKUP

(71) Applicant: Monolithic Power Systems, Inc., San Jose, CA (US)

(72) Inventors: Ming Lu, San Jose, CA (US); Pengjie Lai, San Jose, CA (US); Jian Jiang, Los Gatos, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 81 days.

(21) Appl. No.: 16/372,391

(22) Filed: Apr. 1, 2019

(65) Prior Publication Data

US 2019/0260226 A1 Aug. 22, 2019

Related U.S. Application Data

(63) Continuation-in-part of application No. 15/932,262, filed on Feb. 16, 2018, now Pat. No. 10,523,048.

(51) Int. Cl.
| | |
|---|---|
| *H02J 9/06* | (2006.01) |
| *H02M 3/158* | (2006.01) |
| *H02M 1/08* | (2006.01) |
| *H02H 9/00* | (2006.01) |
| *H02J 7/00* | (2006.01) |
| *H02J 7/34* | (2006.01) |

(52) U.S. Cl.
CPC ............ *H02J 9/061* (2013.01); *H02H 9/00* (2013.01); *H02J 7/00* (2013.01); *H02M 1/08* (2013.01); *H02M 3/158* (2013.01); *H02M 3/1582* (2013.01); *H02J 7/345* (2013.01); *H02J 9/068* (2020.01); *H02J 2207/20* (2020.01)

(58) Field of Classification Search
CPC .... H02J 9/068; H02J 1/14; H02J 7/345; H02J 9/06; H02J 2207/20; H02M 3/158; H02M 1/08; H02H 9/00
See application file for complete search history.

(56) References Cited

U.S. PATENT DOCUMENTS

| | | |
|---|---|---|
| 8,643,351 B2 | 2/2014 | Lai et al. |
| 8,693,276 B2 | 4/2014 | Lai et al. |
| 9,734,917 B2 | 8/2017 | Wang et al. |
| 9,899,834 B1 | 2/2018 | Mayo |
| 9,946,279 B1* | 4/2018 | Dinh .................. H03K 5/08 |
| 9,998,009 B1 | 6/2018 | Lai et al. |

(Continued)

OTHER PUBLICATIONS

U.S. Appl. No. 15/425,820, filed Feb. 6, 2017, Monolithic Power Systems.

(Continued)

*Primary Examiner* — Jared Fureman
*Assistant Examiner* — Duc M Pham
(74) *Attorney, Agent, or Firm* — Perkins Coie LLP

(57) ABSTRACT

A power supply covering both power sharing and power backup functions run in a more efficient and flexible way. The power supply adopts a power sharing converter coupled between a first bus terminal and a second bus terminal, so that if one of the bus terminals provides insufficient power, the other bus terminal kicks in by way of the power sharing converter to provide power support. In addition, a storage capacitor may also kick in to provide power support if one of the bus terminals provide insufficient power via or not via the power sharing converter.

10 Claims, 10 Drawing Sheets

(56) References Cited

U.S. PATENT DOCUMENTS

| | | |
|---|---|---|
| 10,090,675 B1 * | 10/2018 | Lam .......................... H02J 1/14 |
| 2008/0104551 A1 * | 5/2008 | Ouellette ............... G11C 17/18 |
| | | 716/132 |
| 2015/0171665 A1 | 6/2015 | Humphrey et al. |
| 2017/0005571 A1 | 1/2017 | Wang et al. |
| 2017/0186495 A1 | 6/2017 | Yang |
| 2018/0069394 A1 | 3/2018 | Hagen et al. |
| 2019/0260224 A1 | 8/2019 | Lai et al. |
| 2019/0260291 A1 | 8/2019 | Lu et al. |

OTHER PUBLICATIONS

U.S. Appl. No. 15/932,262, filed Feb. 16, 2018, Monolithic Power Systems.
U.S. Appl. No. 16/379,749, filed Apr. 9, 2019, Monolithic Power Systems.

* cited by examiner

POWER SUPPLY AND POWER SUPPLYING METHOD WITH POWER BACKUP

PRIORITY CLAIM

This application is a continuation-in-part of U.S. patent application Ser. No. 15/932,262, filed on Feb. 16, 2018.

FIELD

The present invention relates to electronic circuits, more specifically, the present invention relates to power supply and the method thereof.

BACKGROUND

For high end enterprise solid state drive, for example, SAS SSD and PCLE Card, two input power sources are available for system energy consumption. In the traditional architecture, the input power sources are utilized independently. Thus, when one of the input powers hits its limit, the system cannot consume more power than the limit, which limits the system performance. Power back up function is also required for most enterprise solid state drives. Existing solution couples power back up circuit to one power input source, so if there are several power domains (several loads) that need the backup function, the power domains have to be coupled to this power input source, which further limits the system performance.

Thus, an improved power supply is needed.

SUMMARY

In accomplishing the above and other objects, there has been provided, in accordance with an embodiment of the present invention, a power supply, comprising: a power supply, comprising: an eFuse, configured to deliver an input voltage to a bus terminal, to provide a bus voltage; a power backup converter, coupled to the bus terminal, to provide a charge path from the bus terminal to a storage capacitor to store energy in the storage capacitor, and to provide a discharge path from the storage capacitor to the bus terminal; and a controller, configured to control the power backup converter in response to a current sense signal indicative of a current flowing through the eFuse and a feedback voltage indicative of the bus voltage.

In addition, there has been provided, in accordance with an embodiment of the present invention, a power supply, comprising: a power supply, comprising: an eFuse, configured to convert an input voltage to an output voltage to power a load; and a power backup converter, configured to store energy in a storage capacitor when a load current is below a current limit, and to release the energy stored at the storage capacitor to the load when a) the load current is beyond the current limit, and b) the output voltage drops to a voltage threshold.

Furthermore, there has been provided, in accordance with an embodiment of the present invention, a power supplying method, comprising: converting an input voltage to an output voltage to power a load; charging a storage capacitor by the input voltage via a power backup converter; and monitoring a load current and the output voltage, if the load current exceeds a current limit and the output voltage drops to a voltage threshold, releasing energy stored at the storage capacitor to provide power support to the load by way of the power backup converter.

The use of the similar reference label in different drawings indicates the same of like components.

DETAILED DESCRIPTION

Embodiments of circuits for power supplies are described in detail herein. In the following description, some specific details, such as example circuits for these circuit components, are included to provide a thorough understanding of embodiments of the invention. One skilled in relevant art will recognize, however, that the invention can be practiced without one or more specific details, or with other methods, components, materials, etc.

The following embodiments and aspects are illustrated in conjunction with circuits and methods that are meant to be exemplary and illustrative. In various embodiments, the above problem has been reduced or eliminated, while other embodiments are directed to other improvements.

Figure 1:
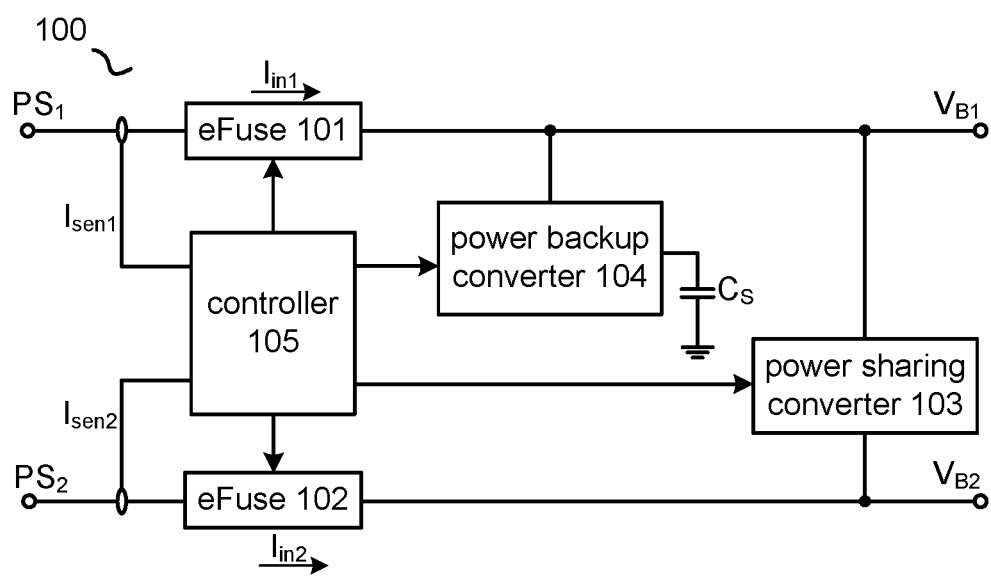
FIG. 1 schematically shows a power supply 100 in accordance with an embodiment of the present invention.

FIG. 1 schematically shows a power supply 100 in accordance with an embodiment of the present invention. In the example of FIG. 1, the power supply 100 comprises: a first eFuse 101, configured to deliver a first input power source $PS_1$ to a first bus terminal, to provide a first bus voltage $V_{B1}$; a second eFuse 102, configured to deliver a second input power source $PS_2$ to a second bus terminal, to provide a second bus voltage $V_{B2}$; a power sharing converter 103, coupled between the first bus terminal and the second bus terminal, to provide an electrical path between the first bus terminal and the second bus terminal; a power backup converter 104, coupled to the first bus terminal, to provide a charge path from the first bus terminal to a storage capacitor $C_S$, and to provide a discharge path from the storage capacitor $C_S$ to the first bus terminal; and a controller 105, configured to control the first eFuse 101, the second eFuse 102, the power sharing converter 103 and the power backup converter 104 in response to a first sense signal $I_{sen1}$ indicative of the first input power source $PS_1$ and a second sense signal $I_{sen2}$ indicative of the second input power source $PS_2$.

In one embodiment, the first sense signal $I_{sen1}$ indicates an input current of the first input power source PS1 (a current $(I_{in1})$ flowing through the first eFuse 101), and the second sense signal $I_{sen2}$ indicates an input current of the second input power source $PS_2$ (a current $(I_{in2})$ flowing through the second eFuse 102).

In the embodiment of FIG. 1, the power backup converter 104 is coupled to the first bus terminal. However, one of ordinary skill in the art should realize that the power backup converter 104 may also be coupled to the second bus terminal.

In one embodiment, the first input power source $PS_1$ and the second input power source $PS_2$ may be coupled together, and the first bus voltage $V_{B1}$ and the second bus voltage $V_{B2}$ may also be coupled together to supply a load (e.g. a downstream DC-DC converter, not shown). In other embodiments, the first bus voltage $V_{B1}$ and the second bus voltage $V_{B2}$ may not be coupled together and respectively supply a load.

In one embodiment, if one of the input currents hits a current limit threshold, the other input power source kicks in via the power sharing converter 103 to provide power support. For example, if a load coupled to the first bus terminal requires a high current, or more loads are coupled to the first bus terminal, causing the current flowing through the first eFuse 101 to hit its current limit threshold, the power sharing converter 103 will be active (triggered), so that the second input power source $PS_2$ provides additional power to the first bus terminal.

In one embodiment, if one of the input power sources outage happens, the other input power source kicks in via the power sharing converter 103 to provide power support. That is, if the first input power source $PS_1$ outage happens, the second input power source $PS_2$ kicks in via the power sharing converter 103 to power the load that is coupled to the first bus terminal; or if the second input power source $PS_2$ outage happens, the first input power source $PS_1$ kicks in via the power sharing converter 103 to power the load that is coupled to the second bus terminal.

In one embodiment, either if both of the two input power sources outage happens, or one of the input power sources outage happens, the power backup converter 104 is active (triggered), to supply additional power to the load from the storage capacitor $C_S$.

In one embodiment, if the power supplied by the first input power source $PS_1$ and/or the second input power source $PS_2$ is not enough for the load (e.g., the load steps up suddenly and lasts for a short time), the power backup converter 104 is active (triggered), to supply additional power to the load from the storage capacitor $C_S$.

In one embodiment, the power backup converter 104 may support the load directly. In other embodiments, the power backup converter 104 may support the load by way of the power sharing converter 103.

Figure 2:
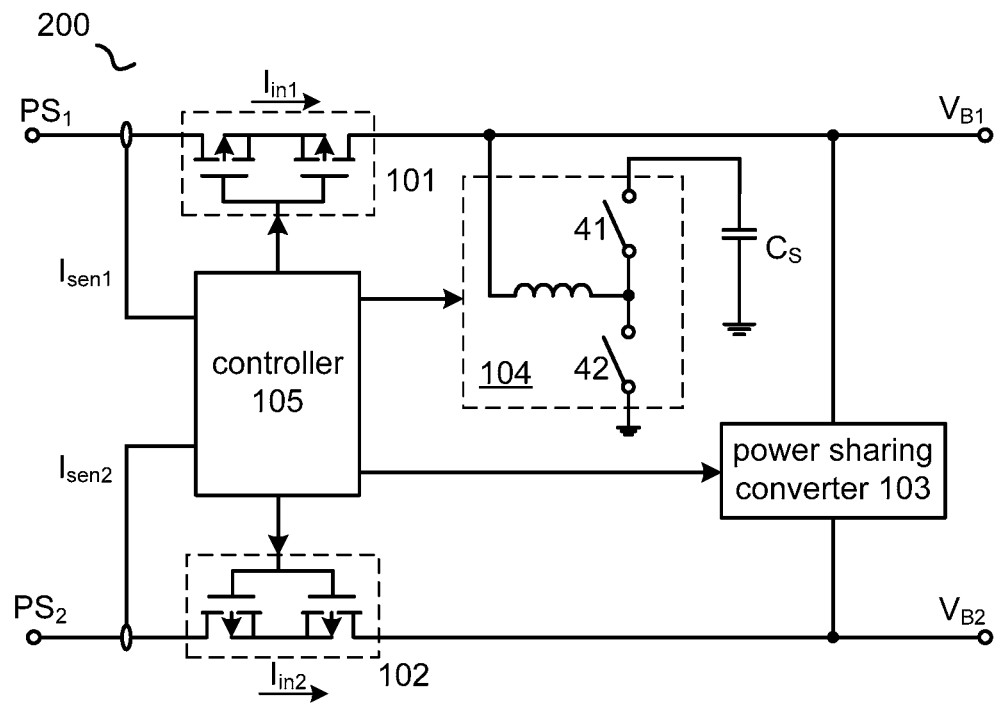
FIG. 2 schematically shows a power supply 200 in accordance with an embodiment of the present invention.

FIG. 2 schematically shows a power supply 200 in accordance with an embodiment of the present invention. In the example of FIG. 2, the first eFuse 101 and the second eFuse 102 each comprises a back to back switch to block reverse current; the power backup converter 104 comprises a bidirectional buck-boost converter.

Specifically, when the first input power source $PS_1$ is plugged, it is delivered to the first bus terminal by way of the first eFuse 101. Then the storage capacitor $C_S$ is charged by periodically turning a high side switch 41 and a low side switch 42 on and off, until a voltage across the storage capacitor $C_S$ reaches a target voltage. If either both of two input power sources outage happens, or the load consumes more power than the first input power source $PS_1$ and/or the second input power source $PS_2$ can provide (e.g., the two input currents both reach their current thresholds), the storage capacitor $C_S$ will be discharged through the power backup converter 104 to support the load.

Figure 3:
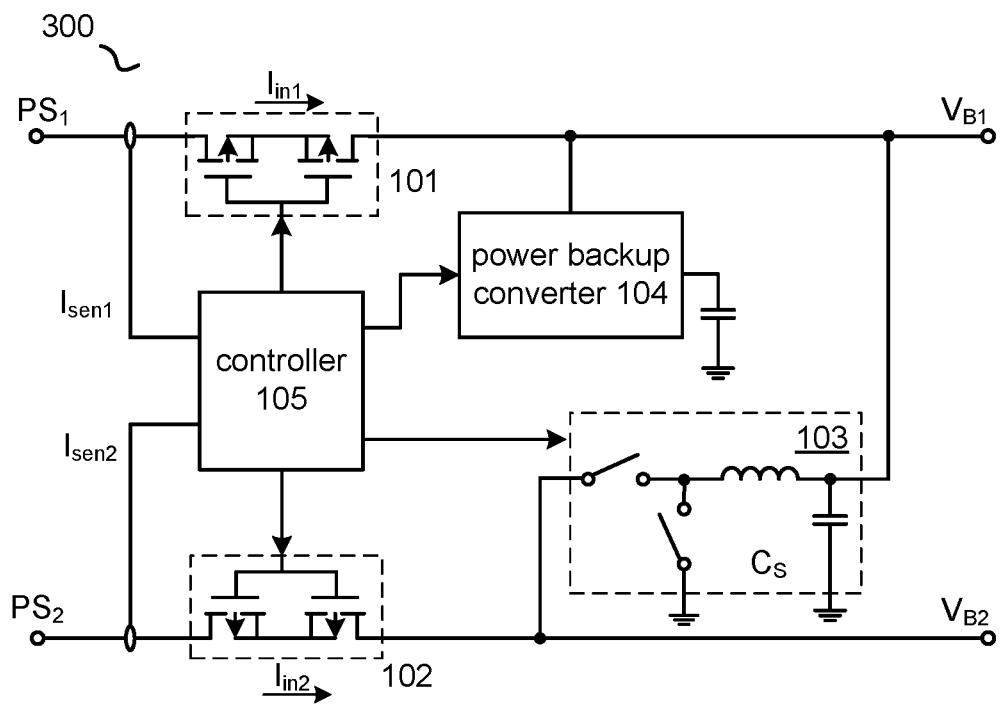
FIG. 3 schematically shows a power supply 300 with a circuit configuration of the power sharing converter 103 in accordance with an embodiment of the present invention.

FIG. 3 schematically shows a power supply 300 with a circuit configuration of the power sharing converter 103 in accordance with an embodiment of the present invention. In the example of FIG. 3, the power sharing converter 103 comprises a bidirectional buck-boost converter. For example, in one embodiment, if the first bus terminal is supported by the second bus voltage $V_{B2}$, the power sharing converter 103 may operate as a buck converter to lower down the second bus voltage $V_{B2}$ to the first bus voltage $V_{B1}$. In another embodiment, if the second bus terminal is supported by the first bus voltage $V_{B1}$, the power sharing converter 103 may operate as a boost converter to pump up the first bus voltage $V_{B1}$ to the second bus voltage $V_{B2}$.

Figure 4:
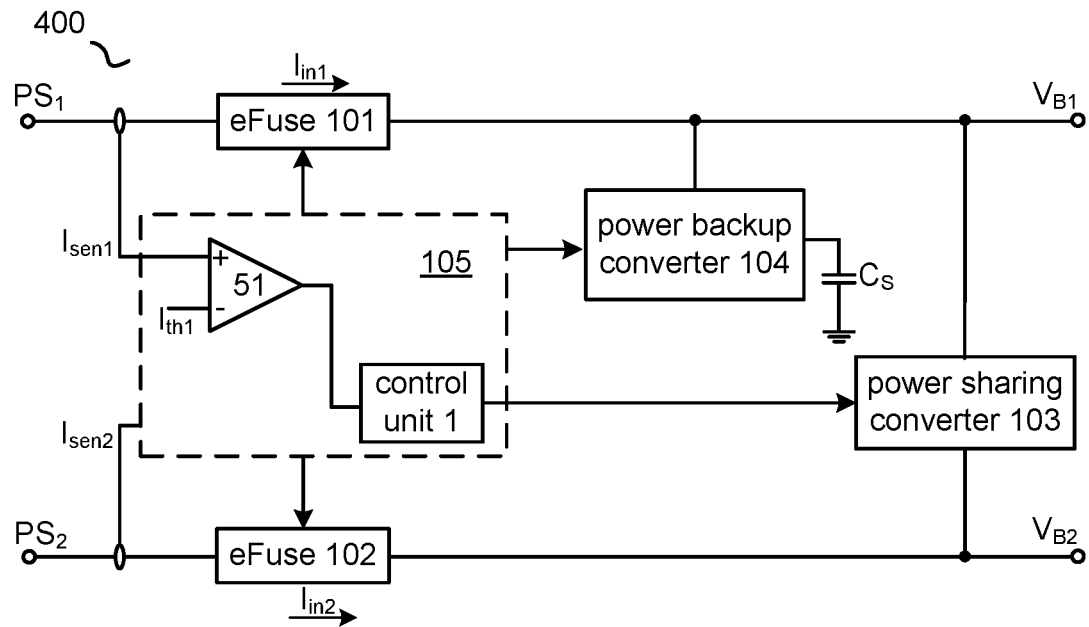
FIG. 4 schematically shows a power supply 400 with a controller 105 in accordance with an embodiment of the present invention.

FIG. 4 schematically shows a power supply 400 with a controller 105 in accordance with an embodiment of the present invention. In the example of FIG. 4, the controller 105 comprises: a first comparator 51, configured to compare the first sense signal $I_{sen1}$ with a first current limit threshold $I_{TH1}$; and a first control unit 1, configured to control the power sharing converter 103 in response to the comparison result of the first comparator 51. If the input current of the first input power source $PS_1$ is higher than the first current limit threshold $I_{TH1}$, which means the load coupled to the first bus terminal may require more power than set, the first control unit 1 will control the power sharing converter 103 to be active, so that the second power source $PS_2$ will kick in to provide power support to the first bus terminal.

Figure 5:
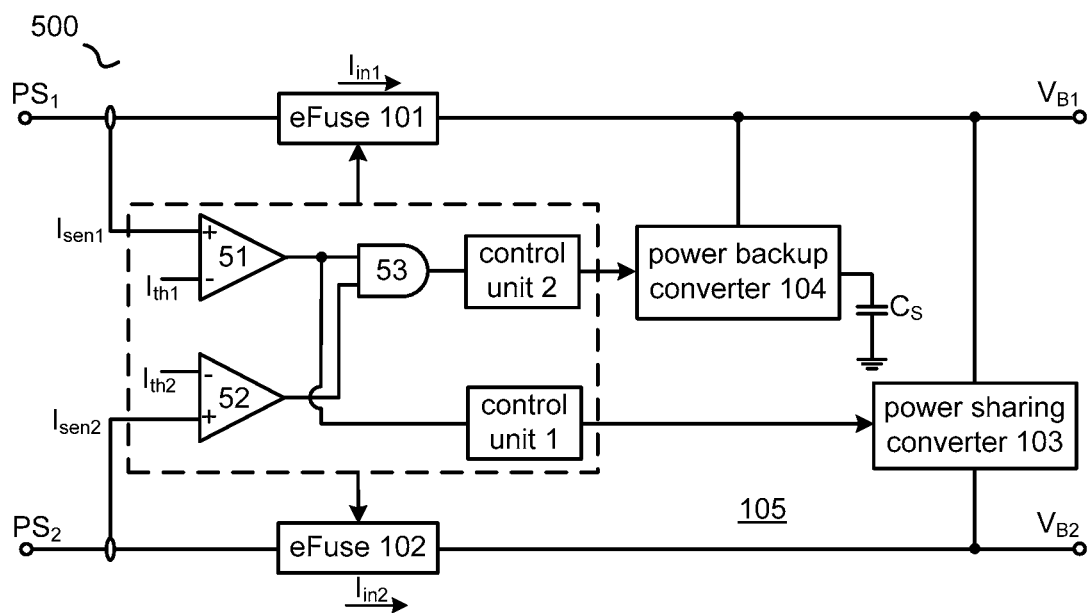
FIG. 5 schematically shows a power supply 500 with a controller 105 in accordance with an embodiment of the present invention.

FIG. 5 schematically shows a power supply 500 with a controller 105 in accordance with an embodiment of the present invention. In the example of FIG. 4, the controller 105 comprises: a first comparator 51, configured to compare the first sense signal $I_{sen1}$ with a first current limit threshold km; a second comparator 52, configured to compare the second sense signal $I_{sen2}$ with a second current limit threshold $I_{th2}$; a logical AND unit 53, configured to execute a logical AND operation on the comparison results of the first and second comparators; a first control unit 1, configured to control the power sharing converter 103 in response to the comparison result of the first comparator 51; and a second control unit 2, configured to control the power backup converter 104 in response to the logical AND result of the logical AND unit 53.

If the input current of the first input power source $PS_1$ and the second input power source $PS_2$ is higher than the first current limit threshold km and the second current limit threshold $I_{th2}$, respectively, meaning that the power supplied by the first input power source $PS_1$ and/or the second input power source $PS_2$ is not enough for the load, the second control unit 2 will control the power backup converter 104 to be active, so that the storage capacitor $C_S$ may provide additional power support to the load.

In one embodiment, the power backup converter 104 may be enabled by detecting the first bus voltage $V_{B1}$ or the second bus voltage $V_{B2}$.

Figure 6:
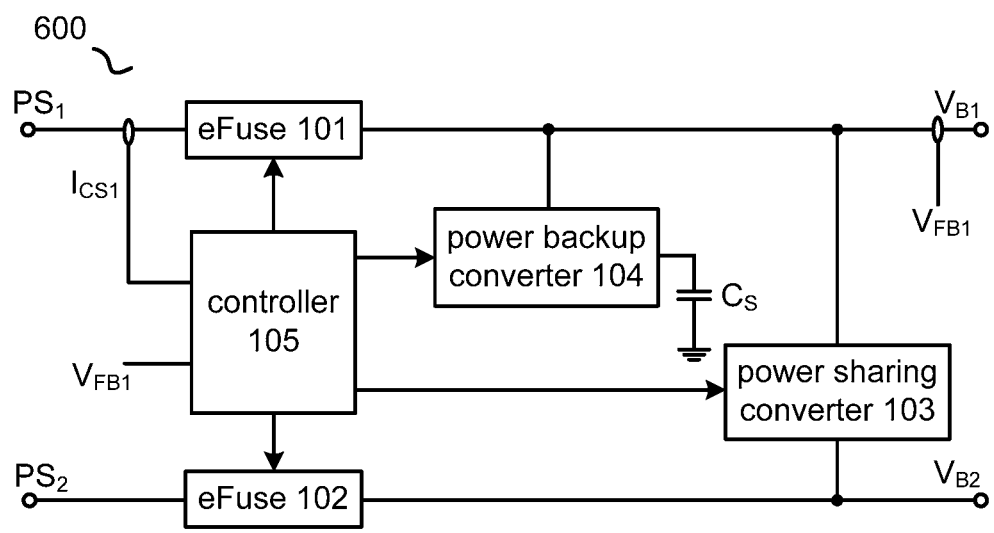
FIG. 6 schematically shows a power supply 600 in accordance with an embodiment of the present invention.

FIG. 6 schematically shows a power supply 600 in accordance with an embodiment of the present invention. In the example of FIG. 6, the power supply 600 comprises: a first eFuse 101, configured to deliver a first input power source $PS_1$ to a first bus terminal, to provide a first bus voltage $V_{B1}$; a second eFuse 102, configured to deliver a second input power source $PS_2$ to a second bus terminal, to provide a second bus voltage $V_{B2}$; a power sharing converter 103, coupled between the first bus terminal and the second bus terminal, to provide an electrical path between the first bus terminal and the second bus terminal; a power backup converter 104, coupled to the first bus terminal, to provide a charge path from the first bus terminal to a storage capacitor $C_S$ and to provide a discharge path from the storage capacitor $C_S$ to the first bus terminal under different situations; and a controller 105, configured to control the first eFuse 101, the second eFuse 102, the power sharing converter 103 and the power backup converter 104 in response to a current sense signal $I_{CS1}$ indicative of a current flowing through the first eFuse 101 and a voltage feedback signal $V_{FB1}$ indicative of the first bus voltage $V_{B1}$.

In one embodiment, if the current flowing through the first eFuse 101 hits a current limit threshold, the second input power source $PS_2$ kicks in by way of the power sharing converter 103 to provide power support.

During a startup process, when the first input power source $PS_1$ is available and above an under voltage threshold, the storage capacitor $C_S$ is charged by the first input power source $PS_1$ by way of the first eFuse 101.

If the voltage feedback signal indicates the first bus voltage $V_{B1}$ drops, the storage capacitor $C_S$ kicks in by way of the power backup converter 104 to provide power support.

In one embodiment, the first eFuse 101 and the second eFuse 102 in the power supply 600 may each comprise a back to back switch to block reverse current as in the embodiments shown in FIGS. 2 & 3.

In one embodiment, the power backup converter 104 in the power supply 600 may comprise a bidirectional buck-boost converter as in the embodiment shown in FIG. 2; and the power sharing converter 103 in the power supply 600 may comprise a bidirectional buck-boost converter as in the embodiment shown in FIG. 3.

Figure 7:
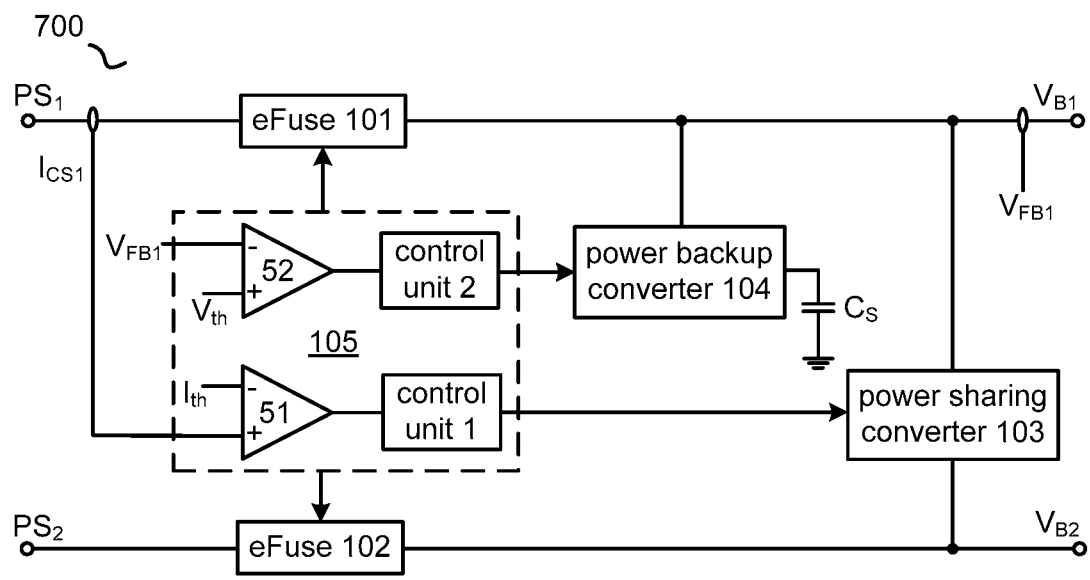
FIG. 7 schematically shows a power supply 700 with a circuit configuration of the controller 105 in accordance with an embodiment of the present invention.

FIG. 7 schematically shows a power supply 700 with a circuit configuration of the controller 105 in accordance with an embodiment of the present invention. In the example of FIG. 7, the controller 105 comprises: a first comparator 51, configured to compare the current sense signal $I_{CS1}$ with a current limit threshold 6; a first control unit 1, configured to control the power sharing converter 103 in response to the comparison between the current sense signal $I_{CS1}$ and the current limit threshold 6; a second comparator 52, configured to compare a voltage feedback signal $V_{FB1}$ indicative of the first bus voltage $V_{B1}$ with a release threshold voltage $V_{th}$, to detect the voltage condition of the first bus voltage $V_{B1}$; and a second control unit 2, configured to control the power backup converter 104 in response to the comparison between the voltage feedback signal $V_{FB1}$ and the release threshold voltage $V_{th}$.

If the current sense signal $I_{CS1}$ is higher than the current limit threshold 61, which means the current flowing through the first eFuse 101 reaches its limit, the first control unit 1 will control the power sharing converter 103 to be active, so that the second input power source $PS_2$ will kick in to provide power support to the first bus terminal.

If the voltage feedback signal $V_{FB1}$ is lower than the release threshold voltage $V_{th}$, which means that the first bus voltage $V_{B1}$ drops, the second control unit 2 will control the power backup converter 104 to be active, so that the storage capacitor $C_S$ may provide additional power support to the load.

The drop of the first bus voltage $V_{B1}$ may be caused by a sudden outage of the first input power source $PS_1$ or a fast step-up of the load coupled to the first bus terminal.

Figure 8:
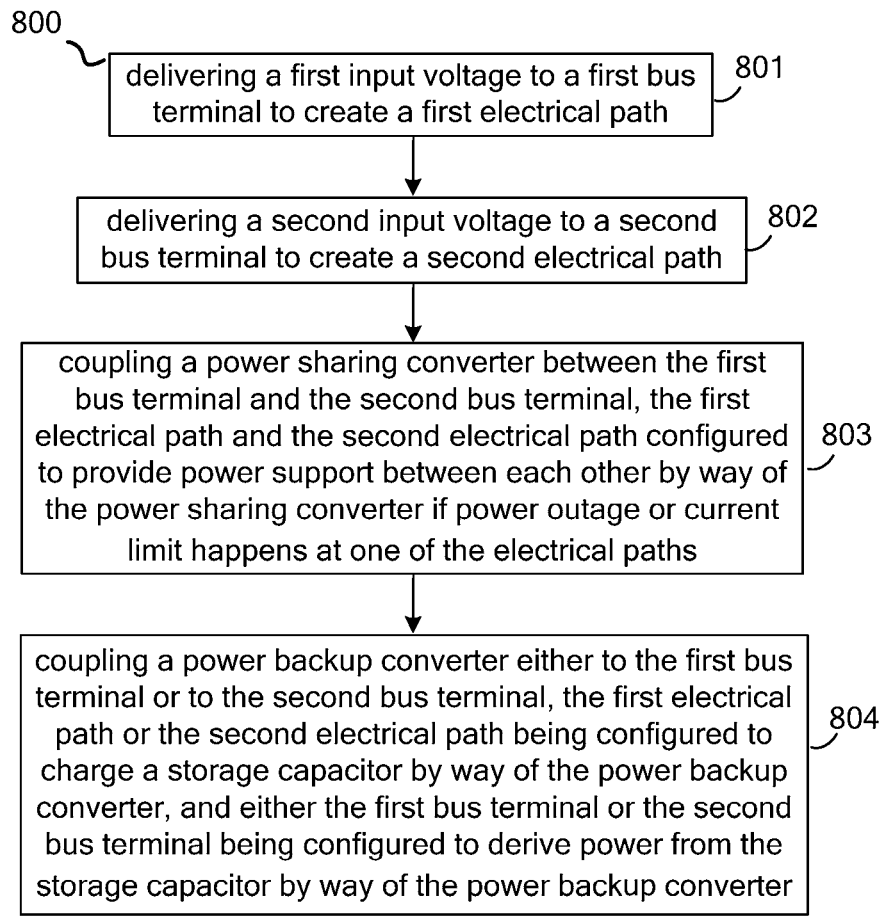
FIG. 8 schematically shows a flowchart 800 of a method used in a power supply in accordance with an embodiment of the present invention.

FIG. 8 schematically shows a flowchart 800 of a power supplying method in accordance with an embodiment of the present invention. The method comprising:

Step 801, delivering a first input voltage to a first bus terminal to create a first electrical path.

Step 802, delivering a second input voltage to a second bus terminal to create a second electrical path. The first electrical path and the second electrical path both supply a load (e.g., a downstream DC-DC converter).

Step 803, coupling a power sharing converter between the first bus terminal and the second bus terminal, the first electrical path and the second electrical path configured to provide power support between each other by way of the power sharing converter if power outage or current limit happens at one of the electrical paths. And Step 804, coupling a power backup converter either to the first bus terminal or to the second bus terminal, the first electrical path or the second electrical path being configured to charge a storage capacitor by way of the power backup converter, and either the first bus terminal or the second bus terminal being configured to derive power from the storage capacitor by way of the power backup converter.

In one embodiment, each of the first electrical path and the second electrical path is created by an eFuse.

In one embodiment, the power sharing converter and the power backup converter each comprises a bidirectional buck-boost converter.

In one embodiment, either if a current flowing through one of the electrical paths hits a current limit threshold, or if one of the input voltages outage happens, the other input voltage kicks in via the power sharing converter to provide power support.

In one embodiment, if both of the input voltages outage happens, the storage capacitor kicks in via the power backup converter to provide power support.

In one embodiment, if either one of the input voltages or both of the input voltages may not supply sufficient power, the storage capacitor kicks in via the power backup converter to provide power support.

Several embodiments of the foregoing power supply run in a more efficient and flexible way. Unlike the conventional technology, several embodiments of the foregoing power supply continue to consume power from the other input power source once one input power source hits the limit or outage happens. In addition, several embodiments of the foregoing power supply derive power from the storage capacitor if both of the input power sources drop, or if the power supplied by the input power source is not sufficient to drive the load.

Figure 9:
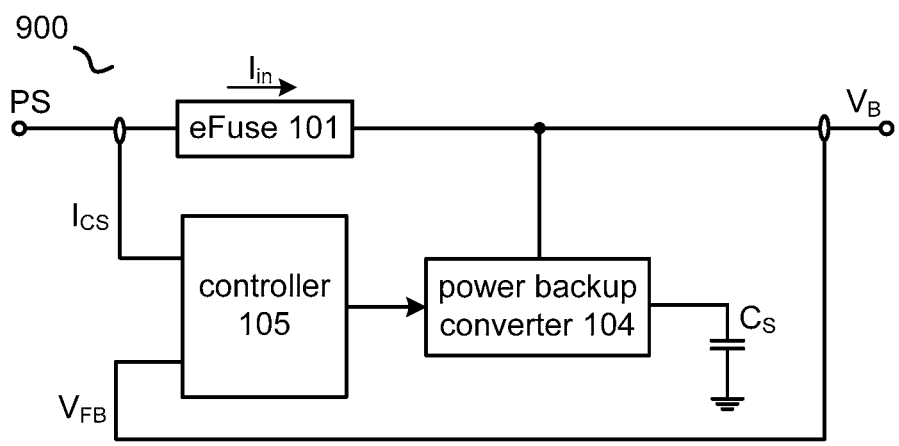
FIG. 9 schematically shows a power supply 900 in accordance with an embodiment of the present invention.

FIG. 9 schematically shows a power supply 900 in accordance with an embodiment of the present invention. In the example of FIG. 9, the power supply 900 comprises: an eFuse 101, configured to deliver an input voltage of a input power source PS to a bus terminal, to provide a bus voltage $V_B$; a power backup converter 104, coupled to the bus terminal, to provide a charge path from the bus terminal to a storage capacitor $C_S$, and to provide a discharge path from the storage capacitor $C_S$ to the bus terminal; and a controller 105, configured to control the power backup converter 104 in response to a current sense signal $I_{CS}$ indicative of a current flowing through the eFuse 101 and a feedback voltage $V_{FB}$ indicative of the bus voltage $V_B$.

In one embodiment, the eFuse 101 is also called as load switch, which delivers the input power source PS to a load coupled to the bus terminal. In one embodiment, the eFuse 101 may comprise a back to back switch to block reverse current as in the embodiments shown in FIGS. 2 & 3.

In one embodiment, the storage capacitor $C_S$ is charged by the input power source PS via the eFuse 101 and the power backup converter 104 at startup process. During the normal operation of the power supply 900, the input voltage is delivered to the bus terminal by way of the eFuse 101 to power the load. If the load current increases to hit its current limit, i.e., the current flowing through the eFuse 101 hits a current limit, the bus voltage $V_B$ starts to decrease. When the bus voltage $V_B$ drops to a voltage threshold, the power backup converter 104 is active, and the storage capacitor $C_S$ kicks in by way of the power backup converter 104 to provide power support. Then the power backup converter 104 will operate in release mode to regulate the bus voltage $V_B$ at a set voltage value, and the energy stored in the storage capacitor $C_S$ is released to provide extra load power.

Figure 10:
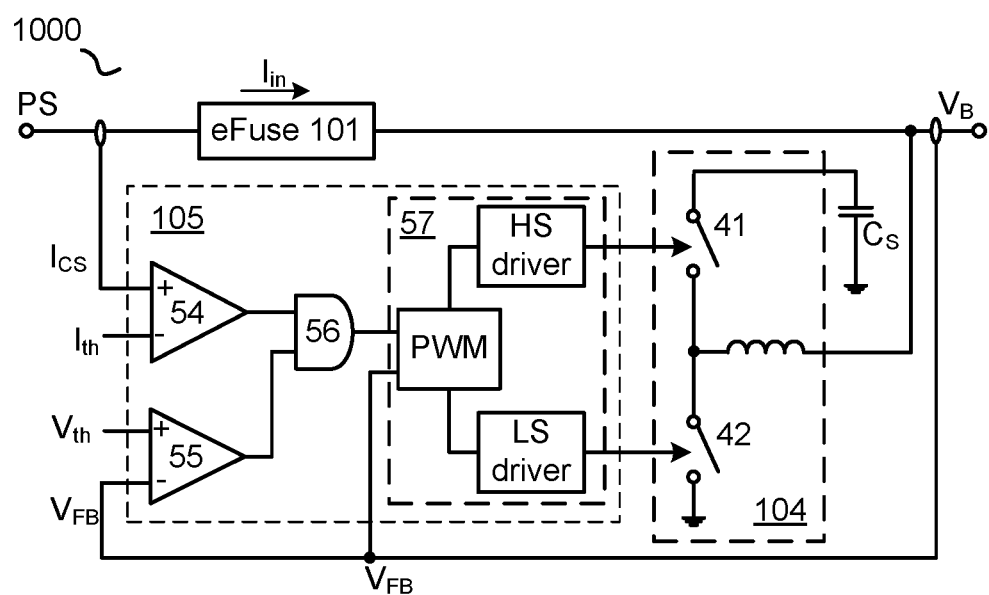
FIG. 10 schematically shows a power supply 1000 with a circuit configuration of the controller 105 in accordance with an embodiment of the present invention.

FIG. 10 schematically shows a power supply 1000 with a circuit configuration of the controller 105 in accordance with an embodiment of the present invention. In the example of FIG. 10, the controller 105 comprises: a current comparator 54, configured to compare the current sense signal $I_{CS}$ with a current threshold $I_{th}$; a voltage comparator 55, configured to compare the feedback voltage $V_{FB}$ with a release threshold voltage $V_{th}$; and a logical AND circuit 56, configured to enable the power backup converter 104 to release the energy stored at the storage capacitor $C_S$ in response to the comparison results of the current comparator 54 and the voltage comparator 55.

In one embodiment, the logical AND circuit 56 is configured to execute a logical AND operation on the comparison results from the current comparator 54 and the voltage comparator 55. When a) the current sense signal $I_{CS}$ is higher than the current threshold $I_{th}$; and b) the feedback voltage $V_{FB}$ is lower than the release threshold voltage $V_{th}$, the power backup converter 104 is activated, so that the energy stored at the storage capacitor $C_S$ is released to provide power support.

In one embodiment, the power backup converter 104 comprises a bidirectional DC-DC converter, e.g., a bidirectional buck-boost converter.

In one embodiment, the controller 105 further comprises: a PWM control circuit 57, configured to control (e.g., enable/activate) the power backup converter 104 in response to the operation result of the logical AND circuit 56, and to regulate the feedback voltage $V_{FB}$ at a voltage reference.

In one embodiment, the PWM control circuit 57 comprises: a PWM unit, a high side (HS) driver, and low side (LS) driver. The PWM unit is configured to receive the operation result of the logical AND circuit 56 and the feedback voltage $V_{FB}$, to generate control signals which are used to control a high side switch 41 and a low side switch 42 by way of the HS driver and the LS driver, respectively.

In one embodiment, the PWM control circuit 57 may comprise a constant on time controller, which controls the bus voltage $V_B$ to the set voltage value.

Figure 11:
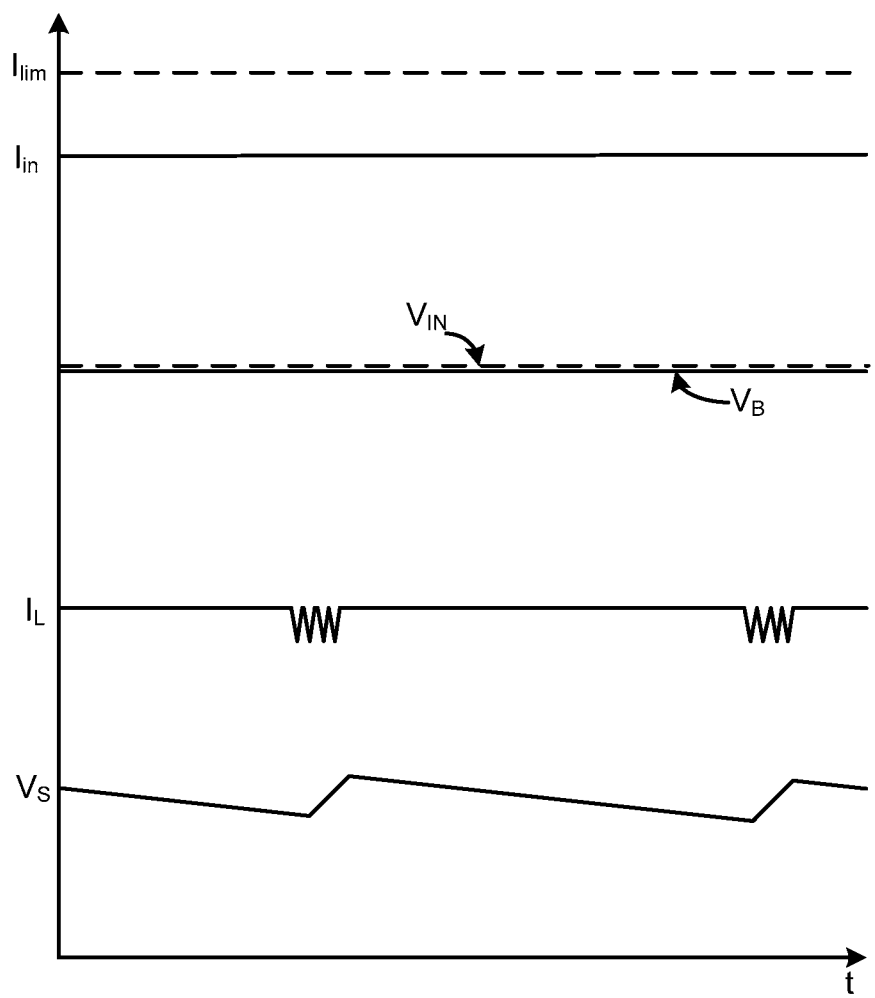
FIG. 11 schematically shows timing waveforms of the eFuse current limit $I_{lim}$, the current flowing through the eFuse $I_{in}$, the voltage $V_{IN}$ of the input power source PS, the bus voltage $V_B$, the current $I_L$ flowing through the power backup converter 104, and the voltage $V_S$ across the storage capacitor $C_S$ when the power supply 900 and/or 1000 is in normal operation.

FIG. 11 schematically shows timing waveforms of the eFuse current limit (load switch current limit) $I_{lim}$, the current flowing through the eFuse $I_{in}$, the voltage $V_{IN}$ of the input power source PS, the bus voltage $V_B$, the current $I_L$ flowing through the power backup converter 104, and the voltage $V_S$ across the storage capacitor $C_S$ when the power supply 900 and/or 1000 is in normal operation. As shown in FIG. 11, in normal operation, the load current is lower than the current limit, so the bus voltage $V_B$ follows $V_{IN}$, and all the required power is supplied from the input power source PS. The storage capacitor $C_S$ is slightly charged up and discharged to maintain itself at desired voltage value.

Figure 12:
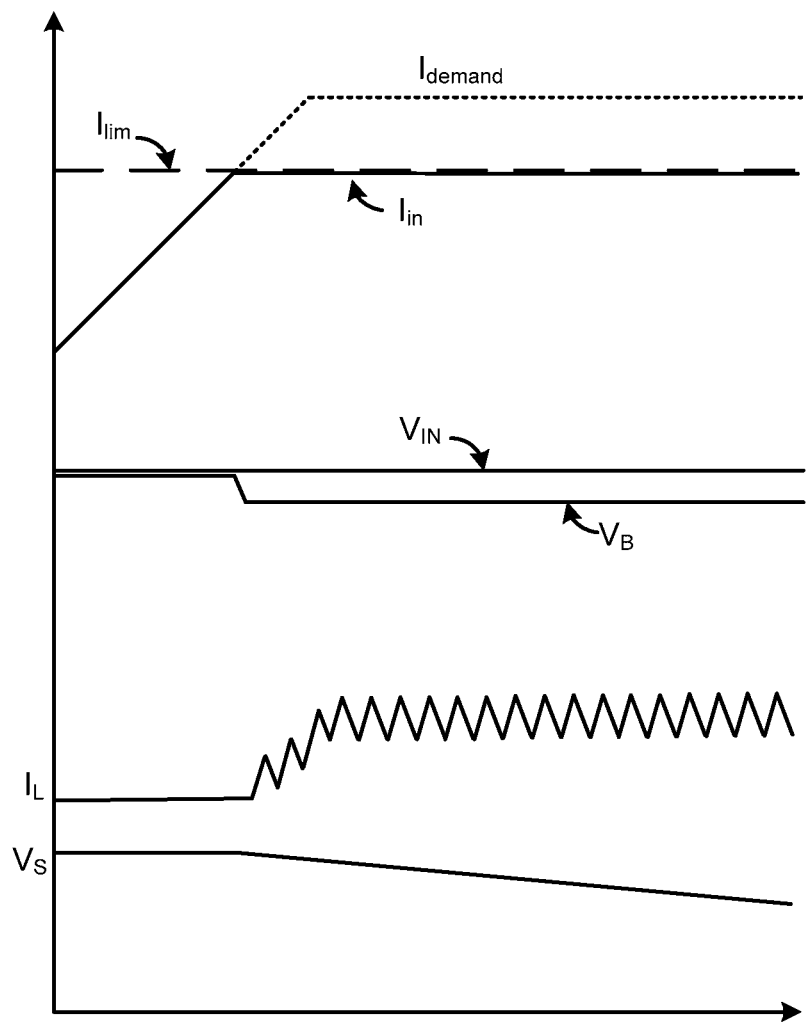
FIG. 12 schematically shows timing waveforms of the load demand current $I_{demand}$, the eFuse current limit him, the current flowing through the eFuse $I_{in}$, the voltage $V_{IN}$ of the input power source PS, the bus voltage $V_B$, the current $I_L$ flowing through the power backup converter 104, and the voltage $V_S$ across the storage capacitor $C_S$ when the load current hits its current limit.

FIG. 12 schematically shows timing waveforms of the load demand current $I_{demand}$, the eFuse current limit (i.e., the load switch current limit) $I_{lim}$, the current flowing through the eFuse $I_{in}$, the voltage $V_{IN}$ of the input power source PS, the bus voltage $V_B$, the current $I_L$ flowing through the power backup converter 104, and the voltage $V_S$ across the storage capacitor $C_S$ when the load current hits its current limit. As shown in FIG. 12, when the load demand current hits the load switch current limit $I_{lim}$, the bus voltage $V_B$ starts to decrease from $V_{IN}$. When the bus voltage $V_B$ drops to a voltage threshold, the feedback voltage $V_{FB}$ is lower than the release threshold voltage $V_{th}$. Then the voltage comparator 55 outputs a logical high signal. This logical high signal would control the power backup converter 104 to release the energy stored at the storage capacitor $C_S$ and to regulate the bus voltage $V_B$ at the desired voltage value. Consequently, the current $I_L$ flowing through the power backup converter 104 is continuous, and the voltage $V_S$ across the storage capacitor $V_S$ starts to fall. As a result, power support for the load is realized through the power backup converter 104.

Figure 13:
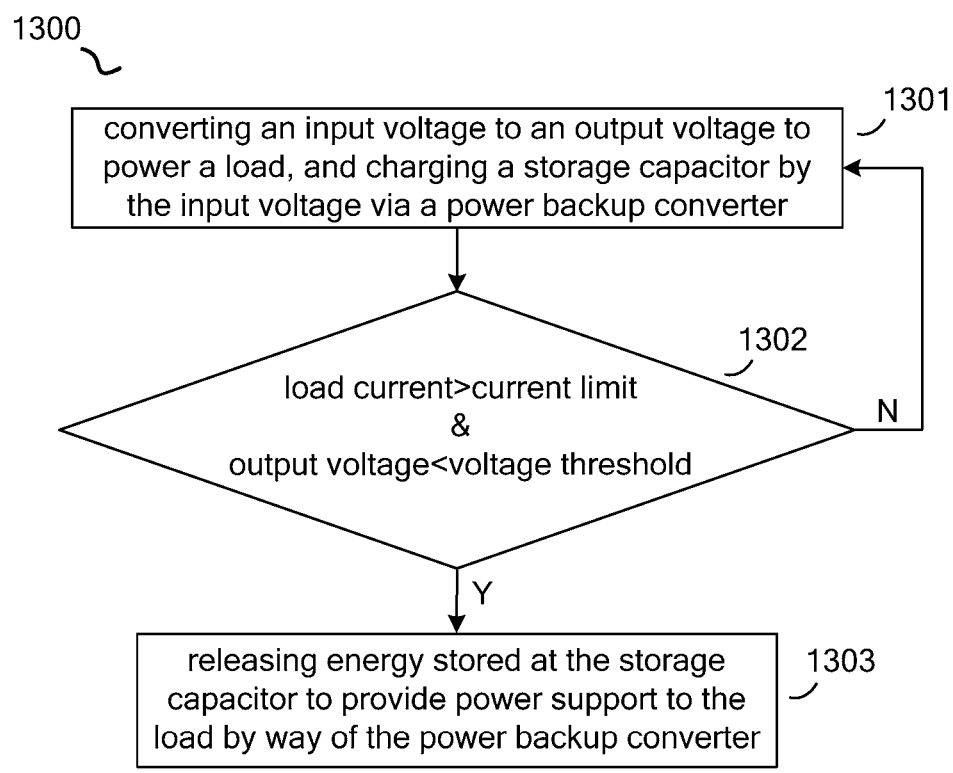
FIG. 13 schematically shows a flowchart 1300 of a power supplying method in accordance with an embodiment of the present invention.

FIG. 13 schematically shows a flowchart 1300 of a power supplying method in accordance with an embodiment of the present invention. The method comprising:

Step 1301, converting an input voltage to an output voltage to power a load, and charging a storage capacitor by the input voltage via a power backup converter.

Step 1302, monitoring a load current and the output voltage. If the load current exceeds a current limit and the output voltage drops to a voltage threshold, entering step 1303.

Step 1303, releasing energy stored at the storage capacitor to provide power support to the load by way of the power backup converter.

In one embodiment, the input voltage is delivered to the output voltage by way of a load switch.

In one embodiment, the load current is monitored by sensing a current flowing through the load switch.

In one embodiment, the method further comprises: controlling the output voltage to a voltage reference by way of the power backup converter.

It is to be understood in these letters patent that the meaning of "A" is coupled to "B" is that either A and B are connected to each other as described below, or that, although A and B may not be connected to each other as described above, there is nevertheless a device or circuit that is connected to both A and B. This device or circuit may include active or passive circuit elements, where the passive circuit elements may be distributed or lumped-parameter in nature. For example, A may be connected to a circuit element that in turn is connected to B.

This written description uses examples to disclose the invention, including the best mode, and also to enable a person skilled in the art to make and use the invention. The patentable scope of the invention may include other examples that occur to those skilled in the art.

What is claimed is:

1. A power supply, comprising:
an eFuse, configured to deliver an input voltage to a bus terminal, to provide a bus voltage;
a power backup converter, coupled to the bus terminal, to provide a charge path from the bus terminal to a storage capacitor to store energy in the storage capacitor, and to provide a discharge path from the storage capacitor to the bus terminal; and
a controller, configured to control the power backup converter in response to a current sense signal indicative of a current flowing through the eFuse and a feedback voltage indicative of the bus voltage; wherein the controller comprises:
a current comparator, configured to compare the current sense signal with a current threshold;
a voltage comparator, configured to compare the feedback voltage with a release threshold voltage; and
a logical AND circuit, configured to activate the power backup converter to release the energy stored at the storage capacitor when a) the current sense signal is higher than the current threshold; and b) the feedback voltage is lower than the release threshold voltage.

2. The power supply of claim 1, wherein:
the logical AND circuit is configured to execute a logical AND operation on the comparison results from the current comparator and the voltage comparator.

3. The power supply of claim 2, wherein the controller further comprises:
a PWM control circuit, configured to control the power backup converter in response to the operation result of the logical AND circuit, and to regulate the feedback voltage at a voltage reference.

4. The power supply of claim 1, wherein:
the eFuse comprises a back to back switch.

5. The power supply of claim 1, wherein:
the power backup converter comprises a bidirectional buck-boost converter.

6. A power supply, comprising:
an eFuse, configured to convert an input voltage to an output voltage to power a load; and
a power backup converter, configured to store energy in a storage capacitor when a load current is below a current limit, and to release the energy stored at the storage capacitor to the load when a) the load current is beyond the current limit, and b) the output voltage drops to a voltage threshold.

7. The power supply of claim 6, wherein:
the eFuse comprises a back to back switch.

8. The power supply of claim 6, wherein:
the power backup converter comprises a bidirectional buck-boost converter.

9. A power supplying method, comprising:
converting an input voltage to an output voltage to power a load;
charging a storage capacitor by the input voltage via a power backup converter; and
monitoring a load current and the output voltage, if the load current exceeds a current limit and the output voltage drops to a voltage threshold, releasing energy stored at the storage capacitor to provide power support to the load by way of the power backup converter.

10. The power supplying method of claim 9, further comprising:
controlling the output voltage to a voltage reference by way of the power backup converter.

* * * * *